US011391401B2

(12) United States Patent
Kang et al.

(10) Patent No.: US 11,391,401 B2
(45) Date of Patent: Jul. 19, 2022

(54) FLANGE GROUNDING DEVICE

(71) Applicant: HYOSUNG HEAVY INDUSTRIES CORPORATION, Seoul (KR)

(72) Inventors: Joon Kyoung Kang, Anyang-si (KR); Chang Woo Han, Goyang-si (KR); Moon Ho Lee, Uiwang-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 66 days.

(21) Appl. No.: 16/961,814

(22) PCT Filed: Dec. 21, 2018

(86) PCT No.: PCT/KR2018/016424
§ 371 (c)(1),
(2) Date: Jul. 13, 2020

(87) PCT Pub. No.: WO2019/143035
PCT Pub. Date: Jul. 25, 2019

(65) Prior Publication Data
US 2021/0071787 A1    Mar. 11, 2021

(30) Foreign Application Priority Data
Jan. 22, 2018   (KR) .......................... 10-2018-0007700

(51) Int. Cl.
*F16L 23/024*      (2006.01)
*F16L 23/00*       (2006.01)
(Continued)

(52) U.S. Cl.
CPC .......... *F16L 23/024* (2013.01); *F16L 23/003* (2013.01); *F16L 25/01* (2013.01); *H01R 4/60* (2013.01); *H01R 4/66* (2013.01)

(58) Field of Classification Search
CPC ....... F16L 23/024; F16L 23/003; F16L 25/01; F16L 23/02; F16L 23/036; F16L 27/1012;
(Continued)

(56) References Cited

U.S. PATENT DOCUMENTS 686,598 A  * 11/1901  Evans ..................... F16L 51/00
1,202,502 A  * 10/1916  Forth
(Continued)

FOREIGN PATENT DOCUMENTS

CN          2741220 Y      11/2005
CN         204459535 U      7/2015
(Continued)

*Primary Examiner* — Zachary T Dragicevich
*Assistant Examiner* — William S. Choi
(74) *Attorney, Agent, or Firm* — Novick, Kim & Lee, PLLC; Jae Youn Kim (57) ABSTRACT

A flange grounding device for grounding between flanges in the case that a predetermined interval is present due to a valve and the like being installed between the flanges when connecting pipes includes: a housing provided with an inner space in which an elastic member is installed, and provided with a rear end brought into close contact with the flange of one side; and an extension member installed inside the housing by being supported at one end of the elastic member, and provided with an opposite end protruded outer side through an inlet of the inner space to be brought into close contact with the flange of another side. Accordingly, even though the interval between the flanges is varied, grounding using one type of grounding device may be reliably performed.

9 Claims, 7 Drawing Sheets (51) Int. Cl.
*F16L 25/01* (2006.01)
*H01R 4/66* (2006.01)
*H01R 4/60* (2006.01)

(58) Field of Classification Search
CPC .......... F16L 25/12; F16L 23/24; F16L 51/00;
H01R 4/60; H01R 4/66
USPC ....................................... 285/405, 412, 368
See application file for complete search history.

(56) References Cited

U.S. PATENT DOCUMENTS

| | | | | | |
|---|---|---|---|---|---|
| 1,475,289 | A | * | 11/1923 | Diescher | ................ F16L 51/00 |
| 5,181,689 | A | * | 1/1993 | Makishima | |
| 2004/0036293 | A1 | * | 2/2004 | Flindall | ................ F16L 23/036 |
| | | | | | 285/412 |
| 2006/0226386 | A1 | * | 10/2006 | Kramer, Jr. | |

FOREIGN PATENT DOCUMENTS

| | | | | |
|---|---|---|---|---|
| CN | 105135136 A | * | 12/2015 | |
| CN | 108758148 A | * | 11/2018 | .............. F16L 23/02 |
| EP | 1218659 B1 | * | 8/2004 | .............. F16L 51/00 |
| KR | 20090024488 A | * | 3/2009 | |
| KR | 10-0959303 B1 | | 5/2010 | |
| KR | 20-2014-0005676 U | | 11/2014 | |
| KR | 20-2016-0004247 U | | 12/2016 | |
| SU | 1201606 A1 | * | 12/1985 | .............. F16L 23/02 |

* cited by examiner

FLANGE GROUNDING DEVICE

TECHNICAL FIELD

The present invention relates to a flange grounding device and, more particularly, to a flange grounding device that electrically connects spaced flanges connecting a pipe to another pipe, thereby performing grounding.

BACKGROUND ART

For example, STATCOM's cooling system has a pipe through which coolant flows. Since these pipes are made of a regular length at the time of manufacture, when a flow path needs to be provided in the size of no less than the regular length, the pipes are connected to extend the flow path. In addition, there are also cases where pipes need to be connected to each other in the course of designing the flow path. Connection of these pipes is accomplished by connecting flanges at ends of the pipes, respectively, to each other.

The flanges of the pipe ends may be coupled in contact with each other. However, when a valve, a flow meter, or the like is installed between ends of pipes, a required space of the valve or flow meter between the ends of the pipes is generated. In this case, wires were used to ground the pipes having a gap therebetween, wherein opposite ends of the wires had to be directly welded to the pipes on both sides or connected to a welded structure. Accordingly, there was an inconvenience.

DISCLOSURE

Technical Problem

Accordingly, an objective of the present invention is to solve the conventional inconvenience as described above and is to allow grounding of the flanges to be ensured when the flanges of the pipes, which have various size gaps therebetween, are coupled to each other.

Another objective of the present invention is to allow a grounding device, which performs grounding of flanges coupled to each other while having a gap in various sizes therebetween, to be firmly fixed and installed.

Technical Solution

According to a feature of the present invention to accomplish the above objectives, there may be provided a flange grounding device, wherein a predetermined interval is present between flanges provided at ends of pipes, respectively, the device grounding between the flanges of both sides and including: a housing having an inner space opened through an inlet of one end and an opposite end being brought into close contact with the flange of one side; an elastic member positioned at the inner space of the housing; and an extension member having one end supported by the elastic member at the inner space of the housing and an opposite end protruding outward of the housing and being in close contact with the flange of another side.

At the opposite end of the housing, a first position setting protrusion may be protrudingly provided, thereby being seated in a first seating groove provided in the flange of the one side, and at the opposite end of the extension member, a second position setting protrusion may be protrudingly provided, thereby being seated in a second seating groove provided in the flange of the another side.

On an outer surface of the opposite end of the housing, on which the first position setting protrusion is provided, a plurality of first anti-rotation protrusions may be provided at predetermined intervals around the first position setting protrusion, thereby being seated in first anti-rotation grooves provided on the flange of the one side.

On an outer surface of the opposite end of the extension member, on which the second position setting protrusion is provided, a plurality of second anti-rotation protrusions may be provided at predetermined intervals around the second position setting protrusion, thereby being seated in second anti-rotation grooves provided on the flange of the another side.

A latching step may be provided at an inner surface of the inlet of the housing, and a hooking step surrounding an outer surface of a rear end of the extension member may be protrudingly provided, thereby regulating an extent of an extension member protruding outward of the housing.

An outer diameter of the hooking step region may be no less than an inner diameter of the inner space of the housing, whereby the extension member may move in a state of being in close contact with an inner surface of the housing, and an inner diameter of the inlet of the latching step region may be no greater than an outer diameter of the extension member, whereby the extension member may also move in a state of being in close contact with the inner surface of the inlet.

According to a feature of the present invention, there may be provided a flange grounding device, wherein a predetermined interval is present between flanges provided at ends of pipes, respectively, the device grounding the spaced flanges by coupling the flanges together using a bolt and a nut and including: a housing having an inner space having both an inlet of one end and a housing penetration portion of an opposite end opened, the opposite end being brought into close contact with the flange of one side; an elastic member positioned at the inner space of the housing; and an extension member having one end supported by an elastic member at the inner space of the housing and an opposite end protruding outward of the housing and being brought into close contact with the flange of another side and provided with a member penetration portion through which the bolt penetrates.

On an outer surface of the opposite end of the housing, on which the housing penetration portion is provided, a plurality of first anti-rotation protrusions may be provided at predetermined intervals, thereby being seated in first anti-rotation grooves provided on the flange of the one side.

On an outer surface, of the opposite end of the extension member, a plurality of second anti-rotation protrusions may be provided at predetermined intervals, thereby being seated in second anti-rotation grooves provided on the flange of the another side.

A latching step may be provided at an inner surface of the inlet of the housing, and a hooking step surrounding an outer surface of a rear end of the extension member may be protrudingly provided, thereby regulating an extent of an extension member protruding outward of the housing.

An outer diameter of the hooking step region may be no less than an inner diameter of the inner space of the housing, whereby the extension member may move in a state of being in close contact with an inner surface of the housing, and an inner diameter of the inlet of the latching step region may be no greater than an outer diameter of the extension member, whereby the extension member may also move in a state of being in close contact with the inner surface of the inlet.

Advantageous Effects

As described above, the following effects can be obtained in the flange grounding device according to the present invention.

First, in the present invention, an extension member between flanges, which have various intervals therebetween, can be brought into close contact with the flanges by being moved in and out of a housing by an elastic force of an elastic member, so opposite ends of the grounding device are brought into close contact with the flanges, whereby there is an effect that grounding action can be ensured with one type of grounding device between flanges having various intervals therebetween.

In addition, in an embodiment of the present invention, the housing has a first position setting protrusion, and the extension member has a second position setting protrusion, whereby the grounding device can be fixedly installed at a specific position between the flanges. Accordingly, there is no problem such as displacement of the position of the grounding device by vibrations and the like occurring in the pipe, and there is an effect for the grounding device to perform the grounding function as designed by being fixed to an exact position.

In addition, the housing has a first rotation prevention protrusion, and the extension member has a second rotation prevention protrusion, whereby the grounding device is allowed not to be rotated due to vibration occurred in the pipe in a state of being installed on the flange. Accordingly, there is an effect that the grounding device is firmly fixed at the exact position.

In addition, in another embodiment of the present invention, a bolt coupling spaced flanges in cooperation with a nut is configured to penetrate the grounding device, whereby the grounding device can be installed without occupying a separate space. Accordingly, there is an effect that space can be better utilized.

MODE FOR INVENTION

Hereinafter, some embodiments of the present invention will be described in detail through exemplary drawings. It should be noted that in adding reference numerals to components of each drawing, the same components, even though displayed on different drawings, have the same reference numerals as far as possible. In addition, in describing the embodiments of the present invention, when it is determined that detailed descriptions of related well-known structures or functions obfuscate understanding of the embodiments of the present invention, detailed descriptions thereof will be omitted.

In addition, in describing the components of the embodiments of the present invention, terms such as first, second, A, B, (a), (b), and the like can be used. Such terms are only for distinguishing the component from other components, and the nature, order, or sequence of the component is not limited by the term. When a component is described as being "connected", "coupled" or "linked" to another component, the component may be directly connected or linked to that another component, but it should be understood that yet another component may be "connected", "coupled", or "linked" between each component.

According to the drawings, the housing 10 is provided with a predetermined inner space 12 defined therein and is a cylindrical shape in the present embodiment. However, the housing 10 is not necessarily a cylindrical shape and for example, may be a tube shape having a polygonal cross section.

An inlet 14 of the inner space 12 is provided at one end of the housing 10, and a latching step 16 surrounding an inner surface edge of the inlet 14 is protrudingly present. The latching step 16 serves to regulate an extent that an extension member 30 to be described below protrudes from the housing 10. The latching step 16 is provided around an entire inner surface of the inlet 14 in this embodiment but is not necessarily required to be so and may be provided only in some sections.

On an opposite side of the inlet 14 at the housing 10, there is a first position setting protrusion 18, and the first position setting protrusion 18 is made in a circular disk shape. The first position setting protrusion 18 is seated in a first seating groove 42 to be described below, thereby fixing the position where the entire grounding device is installed in a flange 41. Here, a center of the circular disk shape of the first position setting protrusion 18 may coincide with a longitudinal center line of the housing 10.

A plurality of first anti-rotation protrusions 19 is provided on an outer surface of one end of the housing 10 in which the first position setting protrusion 18 is provided. The first anti-rotation protrusion 19 protrudes in about a hemispherical shape, and the plurality of first anti-rotation protrusions 19 is provided at predetermined intervals. The first anti-rotation projection 19 is positioned in a first anti-rotation groove 45 of the flange 41 to be described below, whereby the housing 10 is allowed not to rotate with respect to the flange 41.

An elastic member 20 is positioned in the inner space 12 of the housing 10, and a cylindrical coil spring is used as the elastic member 20. The elastic member 20 provides a force such that the extension member 30 to be described below protrudes to the outside of the housing 10 to be brought into close contact with a surface of the flange 41.

The extension member 30, a part of which is positioned in the inner space 12 of the housing 10, is protrudingly provided outside the housing 10 through the inlet 14 of the housing 10. Here, the extension member 30 has a sectional shape corresponding to a sectional shape of the housing 10. Therefore, in the present embodiment, the extension member 30 is made in a cylindrical shape. In addition, a hooking step 32 is provided at a rear end of the extension member 30, thereby being hooked on the latching step 16 of the housing 10. Here, the hooking step 32 region is provided to have a diameter greater than an outer surface of the other region of the extension member 30 so as to be hooked on the latching step 16, whereby the extension member 30 does not fall out of the inner space 12 of the housing 10.

On the other hand, an outer diameter of the hooking step 32 region is equal to or slightly greater than an inner diameter of the inner space 12 of the housing 10. Accordingly, by allowing the housing 10 and the extension member 30 to move relative to each other in a condition of being in close contact with each other in this region, a current-carrying area may be maximally secured. In addition to this, by allowing the inner diameter of the inlet 14 and an outer diameter of the extension member 30 to be also brought into close contact with each other like this, in a region where the latching step 16 is located, a current-carrying area may be maximally secured. That is, the outer diameter of the outer surface of the extension member 30 corresponding to the inner diameter of the inlet 14 in the latching step 16 region may be provided to be equal to or slightly greater than the inner diameter of the inlet 14, and the extension member 30 may be allowed to move in a state of being in close contact with the inlet 14.

On a front end of the extension member 30, there is a second position setting protrusion 34. Here, the second position setting protrusion 34 is protrudingly provided in a circular disk shape so that a center thereof may coincide with a longitudinal center line of the extension member 30. Meanwhile, the second position setting protrusion 34 is seated in a second seating groove 43 of the flange 41.

A plurality of second anti-rotation protrusions 36 is protrudingly provided on the front end surface of the extension member 30, the front end surface being with the second position setting protrusion 34. The second anti-rotation protrusion 36 has the same configuration as the first anti-rotation protrusion 19 and is seated on a second anti-rotation groove 46 of the flange 41 to be described below. Here, the second anti-rotation protrusion 36 is also made in a hemispherical shape.

A configuration related to the flanges 41, to which the grounding device of the present invention is installed, between pipes 40 will be described. According to FIGS. 4 and 5, one end of the pipe 40 has a ring-shaped flange 41. The first seating groove 42 and the second seating groove 43 are provided on surfaces, facing each other, of the flanges 41. The first position setting protrusion 18 of the housing 10 is seated in the first seating groove 42 and the second position setting protrusion 34 is seated in the second seating groove 43. Of course, the first position setting protrusion 18 and the second position setting protrusion 34 may be seated at opposite positions, respectively.

Figure 4:
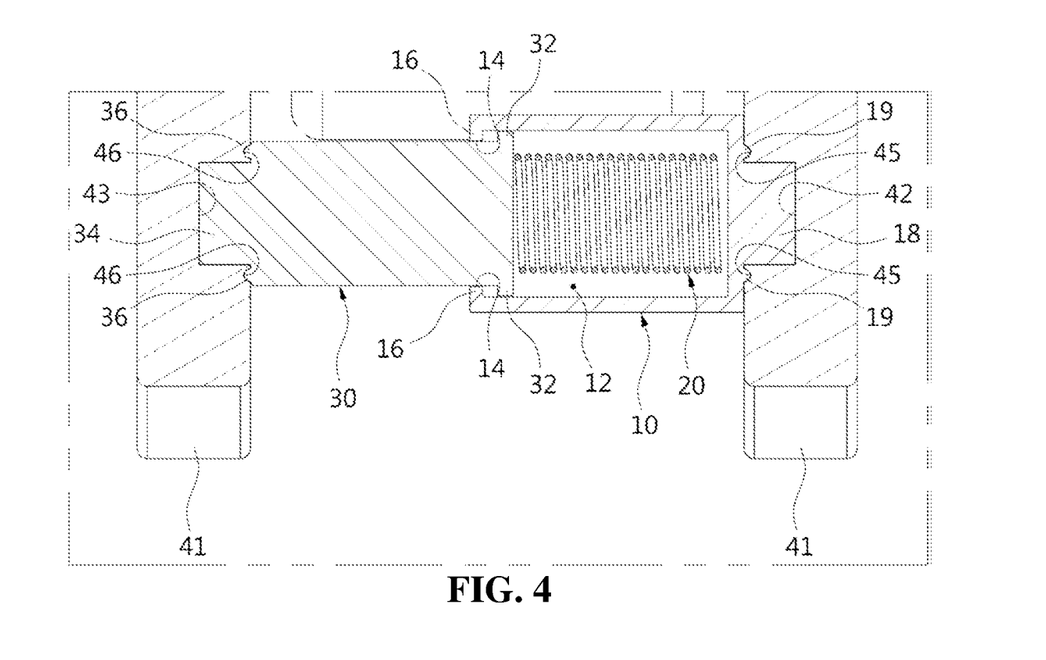
FIG. 4 is a sectional view showing that the embodiment shown in FIG. 1 is installed between flanges.
Figure 5:
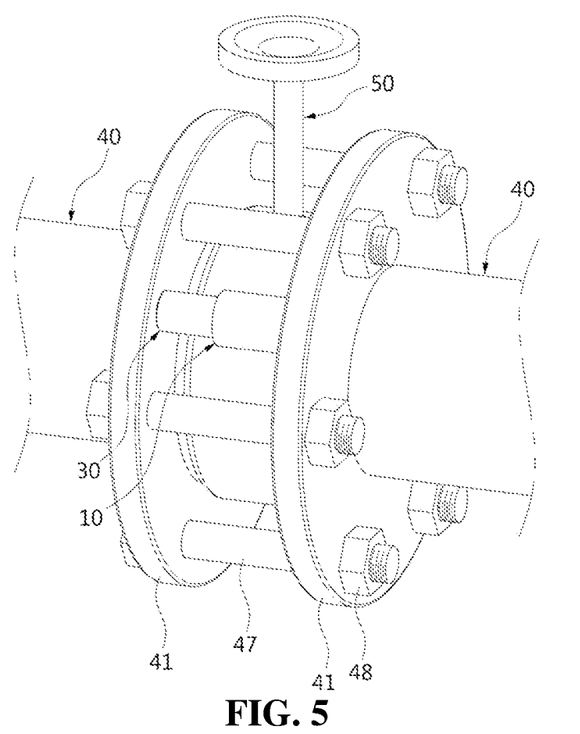
FIG. 5 is a perspective view showing that the embodiment shown in FIG. 1 is installed between the flanges.

On facing surfaces of the flanges 41, the plurality of first anti-rotation grooves 45 is provided around the first seating groove 42, and the plurality of second anti-rotation grooves 46 is provided around the second seating groove 43. The first anti-rotation protrusion 19 is seated in the first anti-rotation groove 45, and the second anti-rotation protrusion 36 is seated in the second anti-rotation groove 46.

Meanwhile, the flanges 41 are fastened by using a plurality of bolts 47 and nuts 48 and may be fastened in a state of being direct contact with each other by bolts 47 and nuts 48. In the illustrated embodiment, there is a predetermined interval, as a valve 50, a flow meter, or the like is positioned, between the flanges 41. As such, since the flanges 41 are not directly in close contact, the spaced flanges 41 are grounded using the grounding device of the present invention.

FIGS. 6 to 9 show another embodiment of the present invention. In the present embodiment, a reference numeral in a 100 unit is assigned to a corresponding component of the above-described embodiment, and reference numerals associated with the pipe 40 and the flange 41 are described using those shown in FIGS. 4 and 5 as they are.

Figure 6:
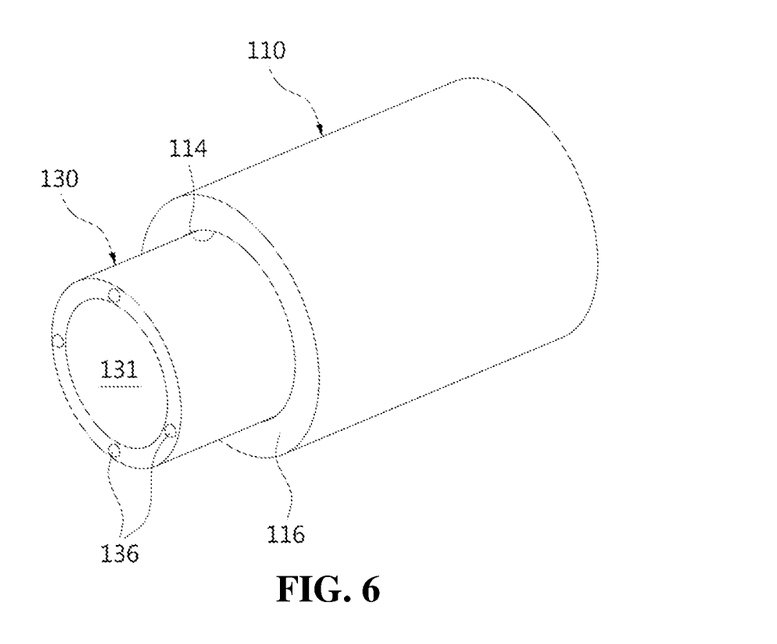
FIG. 6 is a perspective view showing a configuration of another embodiment of the present invention.
Figure 7:
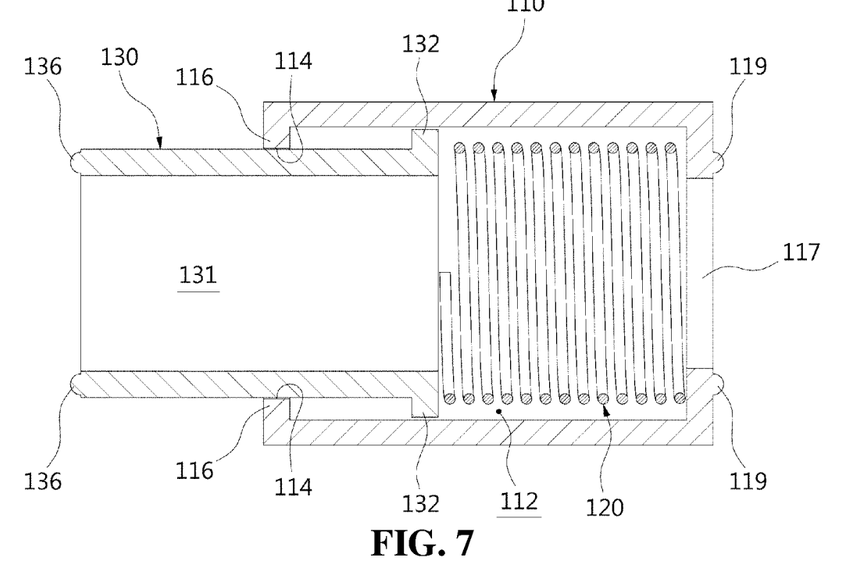
FIG. 7 is a sectional view showing the configuration of the embodiment shown in FIG. 6.

The housing 110 is provided with a predetermined inner space 112 defined therein and is a cylindrical shape in the present embodiment. However, the housing 110 is not necessarily to be a cylindrical shape and for example, may be a tube shape having a polygonal cross section.

An inlet 114 of the inner space 112 is provided at one end of the housing 110, and a latching step 116 surrounding an inner surface edge of the inlet 114 is protrudingly present. The latching step 116 serves to regulate an extent that an extension member 130 to be described below protrudes from the housing 110. The latching step 116 is provided around an entire inner surface of the inlet 114 in this embodiment but is not necessarily required to be so and may be provided only in some sections.

On an opposite side of the inlet 114 at the housing 110, there is a housing penetration portion 117. The housing penetration portion 117 is to allow the inner space 112 to be opened even through the rear end of the housing 110, and is a region through which the bolt 47 passing through the flange 41 passes.

A plurality of first anti-rotation protrusions 119 is provided on an outer surface of one end of the housing 110 in which the housing penetration portion 117 is provided. The first anti-rotation protrusion 119 protrudes in about a hemispherical shape, and the plurality of first anti-rotation protrusions 119 is provided at predetermined intervals. The first anti-rotation projection 119 is positioned in a first anti-rotation groove 45 of the flange 41, whereby the housing 110 is allowed not to rotate with respect to the flange 41.

An elastic member 120 is positioned in the inner space 112 of the housing 110, and a cylindrical coil spring is used as the elastic member 120. The elastic member 120 provides a force such that the extension member 130 to be described below protrudes to the outside of the housing 110 to be brought into close contact with a surface of the flange 41.

The extension member 130, a part of which is positioned in the inner space 112 of the housing 110, is protrudingly provided outside the housing 110 through the inlet 114 of the housing 110. Here, the extension member 130 has a sectional shape corresponding to a sectional shape of the housing 110. Therefore, in the present embodiment, the extension member 130 is made in a cylindrical shape.

A member penetration portion 131 is provided by penetrating the extension member 130 in a longitudinal direction. The member penetration portion 131 is a region through which the bolt 47 passes. Thanks to the member penetration portion 131 and the housing penetration portion 117, the bolt 47 may penetrate the entire grounding device.

A hooking step 132 is provided at a rear end of the extension member 130, thereby being hooked on the latching step 116 of the housing 110. Here, the hooking step 132 region is provided to have a diameter greater than an outer surface of the other region of the extension member 130 so as to be hooked on the latching step 116, whereby the extension member 130 does not fall out of the inner space 112 of the housing 110.

On the other hand, an outer diameter of the hooking step 132 region is equal to or slightly greater than an inner diameter of the inner space 112 of the housing 110. Accordingly, by allowing the housing 110 and the extension member 130 to move relative to each other in a condition of being in close contact with each other in this region, a current-carrying area may be maximally secured. In addition to this, by allowing the inner diameter of the inlet 114 and an outer diameter of the extension member 130, in a region where the latching step 116 is located, to be brought into close contact with each other, a current-carrying area may be maximally secured. That is, the outer diameter of the outer surface of the extension member 130 corresponding to the inner diameter of the inlet 114 in the latching step 116 region may be provided to be equal to or slightly greater than the inner diameter of the inlet 114, and the extension member 130 may be allowed to move in a state of being in close contact with the inlet 114.

A plurality of second anti-rotation protrusions 136 is protrudingly provided on the front end surface of the extension member 130, the front end surface being with the second position setting protrusion 134. The second anti-rotation protrusion 136 has the same configuration as the first anti-rotation protrusion 119 and is seated on a second anti-rotation groove 146 of the flange 141. Here, the second anti-rotation protrusion 136 is also made in a hemispherical shape.

Figure 8:
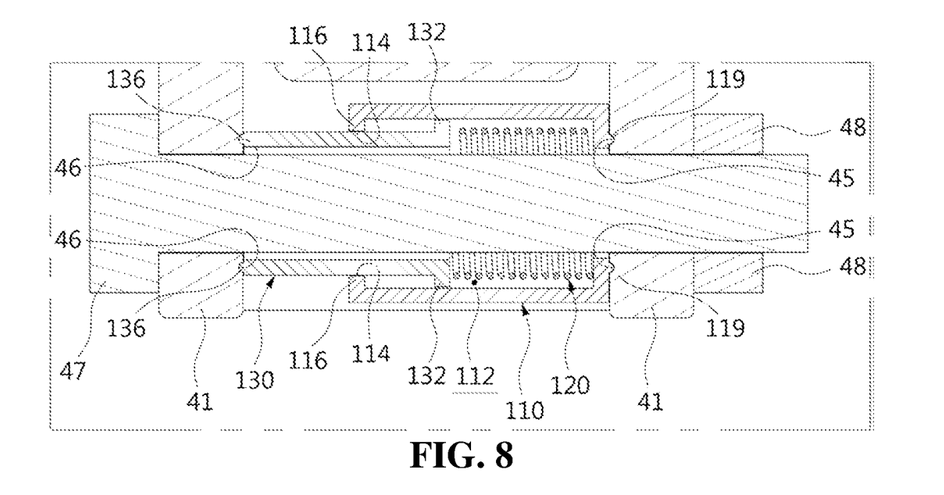
FIG. 8 is a sectional view showing that the embodiment shown in FIG. 6 is installed between flanges.
Figure 9:
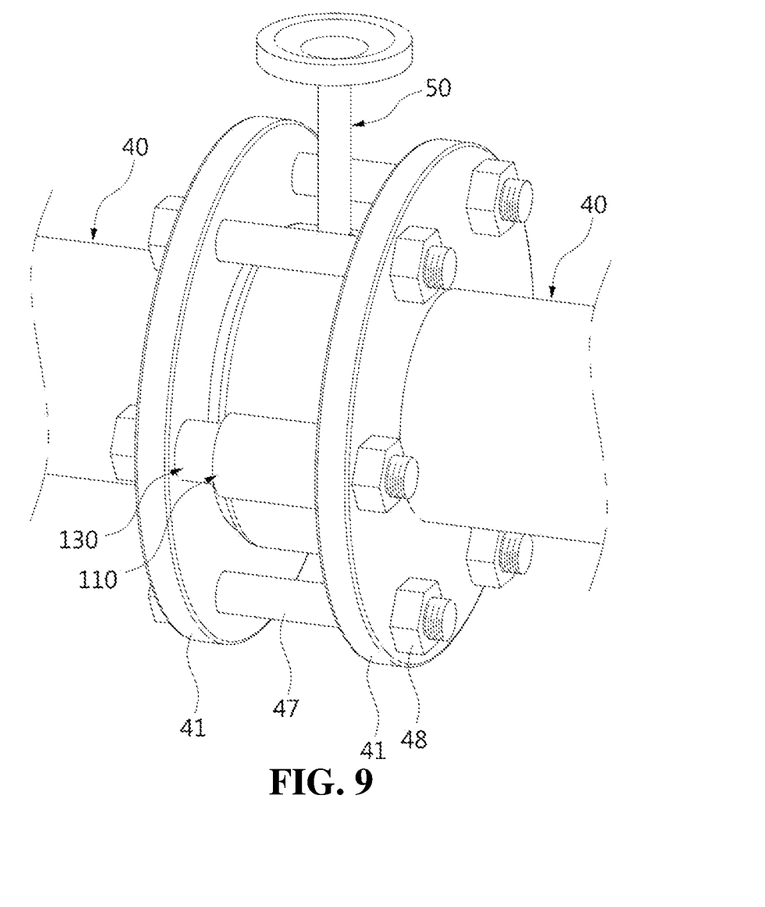
FIG. 9 is a perspective view showing that the embodiment shown in FIG. 6 is installed between the flanges.

Meanwhile, in the present embodiment, the bolt 47 is fastened to the nut 48 by penetrating the flange 41 and at the same time penetrating the housing 110 and the extension member 130. Therefore, the positions where the housing 110 and the extension member 130, respectively, are installed on the flanges 41 are fixed by a bolt 47. In addition, the housing 110 and the extension member 130 are prevented from being rotated as the first anti-rotation protrusion 119 is seated in the first seating groove 42, and the second anti-rotation protrusion 136 is seated in the second seating groove 43.

Hereinafter, it will be described in detail that the flange grounding device according to the present invention having the configuration as described above is assembled and used. For convenience, description will be given with reference to the embodiments shown in FIGS. 1 to 5.

Figure 1:
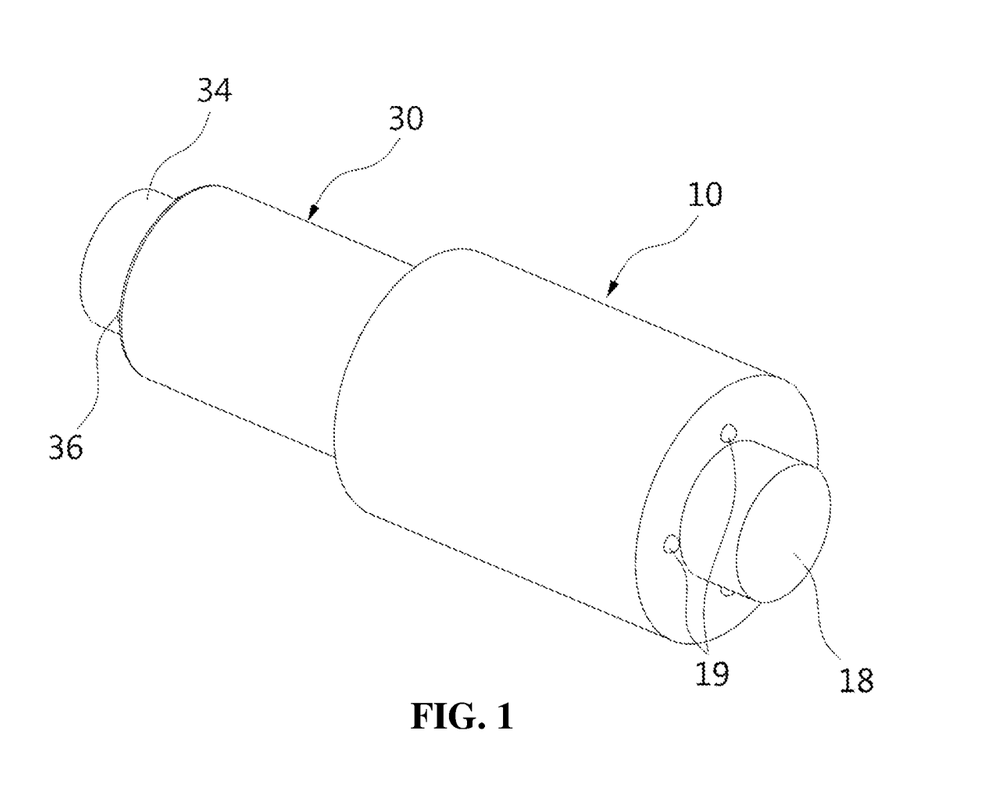
FIG. 1 is a perspective view showing a configuration of an exemplary embodiment of a grounding device according to the present invention.
Figure 2:
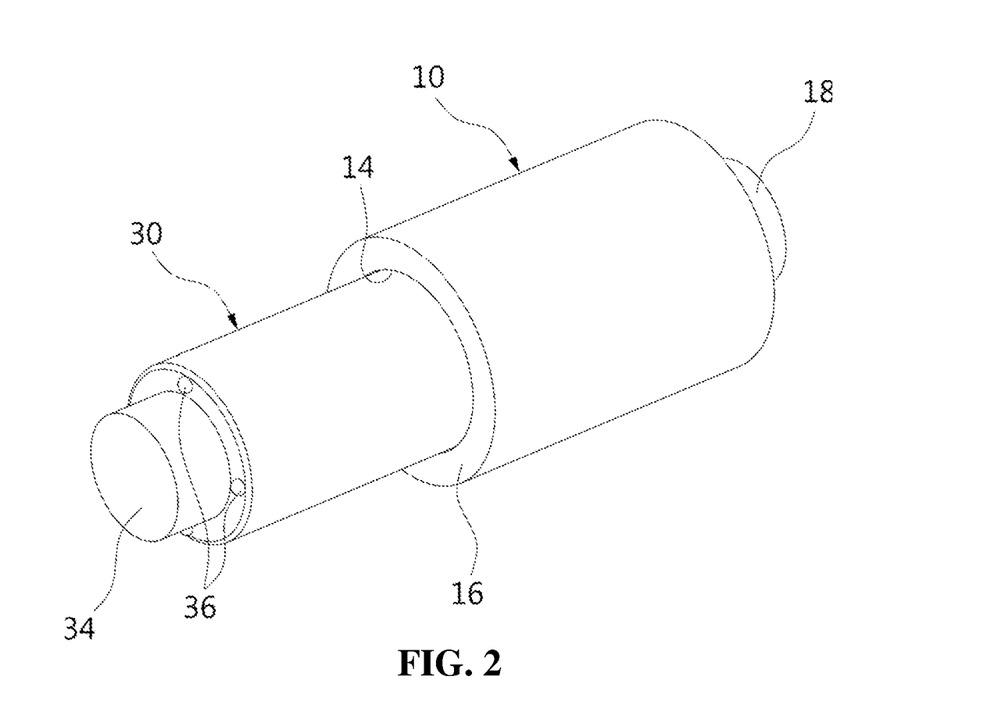
FIG. 2 is a perspective view showing the embodiment shown in FIG. 1 from another direction.
Figure 3:
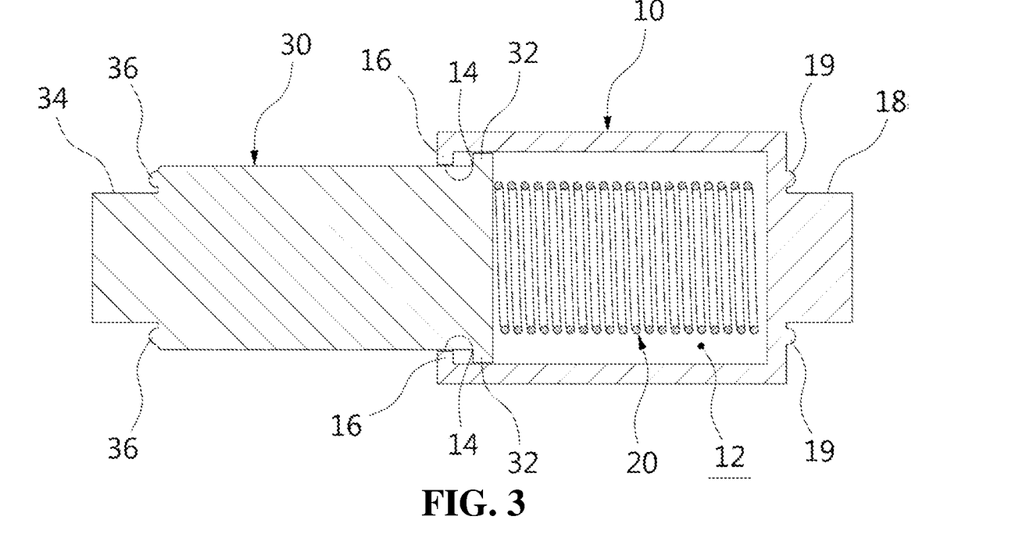
FIG. 3 is a sectional view showing the configuration of the embodiment shown in FIG. 1.

In the drawings, when the extension member 30 is inserted into the inner space 12 of the housing 10, the hooking step 32 is blocked by the latching step 16. In order to resolve this, a front end part including the latching step 16 of the housing 10 is manufactured separately from a remaining part of the housing 10, and female threads and male threads may be formed on the two parts of the housing 10 at opposed positions prior to coupling the two parts together using the male and female threads. In another embodiment, after making the latching step 16 separately, and then inserting the extension member 30 into the inner space 12, the latching step 16 may be attached to the inlet 14 of the housing 10 by welding or the like.

That is, the elastic member 20 is placed in the inner space 12 of the housing 10, the rear end, at which the hooking step 32 is provided, of the extension member 30 is brought into close contact with one end portion of the elastic member 20, and the latching step 16 region is allowed to be coupled to the front end portion of the housing 10 as described above.

The grounding device manufactured as such and as shown in FIGS. 1 to 3 is installed between the flanges 41 as shown in FIGS. 4 and 5. That is, the extension member 30 is placed between the flanges 41 in a state of being inserted into the inner space 12 of the housing 10 while pressing the elastic member 20. In this state, the first position setting protrusion 18 is let to be seated in the first seating groove 42 of the flange 41 of one side. Then, the second position setting protrusion 34 of the extension member 30 is let to be seated in the second seating groove 43 of the flange 41 at a facing side.

To this end, when a force pressing the extension member 30 is removed, while the elastic member 20 is restored, the extension member 30 protrudes from the housing 10, whereby the second position setting protrusion 34 of the front end of the extension member 30 is seated on the second seating groove 43. At this time, the front ends of the first position setting protrusion 18 and the second position setting protrusion 34 need not necessarily be in close contact with the inner surfaces of the first seating groove 42 and the second seating groove 43, respectively. That is, it is sufficient when the outer surface of the first position setting protrusion 18 and the corresponding inner surface of the first seating groove 42 are in close contact, and the outer surface of the second position setting protrusion 34 and the corresponding inner surface of the second seating groove 43 are in close contact.

However, it is necessary that the front end of the extension member 30, that is, the front end surface on which the second anti-rotation protrusion 36 is provided, is brought into close contact with the surface of the flange 41. When the front end surface of the extension member 30 is in close contact with the surface of the flange 41, the second anti-rotation protrusion 36 may accurately enter in the second anti-rotation groove 46. This is also the same as a case related to the first anti-rotation protrusion 19 on the rear end face of the housing 10.

Seating the first anti-rotation protrusion 19 in the first anti-rotation groove 45 and the second anti-rotation protrusion 36 in the second anti-rotation groove 46 may be accomplished by slightly rotating both the housing 10 and the extension member 30 in a state where the first position setting protrusion 18 is seated in the first seating groove 42, and the second position setting protrusion 34 is seated in the second seating groove 43. When there is a state where neither the first anti-rotation protrusion 19 is not inserted into the first anti-rotation groove 45 nor the second anti-rotation protrusion 36 is not inserted into the second anti-rotation groove 46, insertion of the first anti-rotation protrusion 19 and the second anti-rotation protrusion 36 is correspondingly made, in the process of rotating the housing 10 and the extension member 30, and is maintained by the elastic restoring force of the elastic member 20. A state in which the assembly is completed as such is shown in FIGS. 4 and 5.

For reference, only one grounding device is installed in FIGS. 4 and 5, but several numbers of the grounding devices may be installed depending on design conditions.

Next, the state shown in FIGS. 8 and 9 will be described. In the present embodiment, a bolt 47 and a nut 48 for coupling the flanges 41 are used to fix the installation position of the housing 110 and the extension member 130 constituting the grounding device. That is, the grounding device is fixed by allowing the bolt 47 to penetrate the housing 110 and the extension member 130 and penetrate both flanges 41 of opposite sides at the same time.

As above, when the housing 110 and the extension member 130 are rotated at a predetermined angle in a state where the installation position of the grounding device is set by using the bolt 47, the first anti-rotation protrusion 119 and the second anti-rotation protrusion 136 are seated in the first anti-rotation groove 45 and the second anti-rotation groove 46, respectively, of the flange 41. Accordingly, unless an external force of no less than a predetermined level is applied, the grounding device is held not to rotate due to vibration and the like.

In the above, even though all the components constituting the embodiments of the present invention are described as being combined in one or as operated by being combined in one, the present invention is not necessarily limited to such embodiments. That is, within the scope of the present invention, all of the components may be operated by being selectively combined in no less than one. In addition, the terms "include", "consist" or "have" as described above mean that a corresponding component may be embedded unless specifically stated otherwise, so should be interpreted as being able to further include other components, not to exclude other components. All terms, including technical or scientific terms, have the same meaning as generally understood by a person skilled in the art to which the present invention pertains, unless defined otherwise. Commonly used terms, such as defined by dictionaries, should be interpreted as being consistent with the contextual meaning of the related art, and are not to be interpreted as ideal or excessively formal meanings unless explicitly defined in the present invention.

The above description is merely illustrative of the technical idea of the present invention, and those skilled in the art to which the present invention pertains may make various modifications and variations without departing from the essential characteristics of the present invention. Therefore, the embodiments disclosed in the present invention are not intended to limit the technical spirit of the present invention, but to explain, and the scope of the technical spirit of the present invention is not limited by these embodiments. The scope of protection of the present invention should be interpreted by the claims below, and all technical spirits within the scope equivalent to the claims should be interpreted as being included in the scope of the present invention.

In the present invention, at least the housings 10 and 110 and the extension members 30 and 130 are made of a material having good electrical conductivity, for example, copper or copper alloy.

In the embodiment shown in FIGS. 1 to 5, the spaced flanges 41 are fastened together using the bolt 47 and the nut 48. However, it should be understood that the spaced flanges 41 may not be necessarily fastened using the bolt 47 and the nut 48. In other words, the flanges 41 may be fastened to each other using various other fastening structures.

In the illustrated embodiments, the first anti-rotation protrusions 19 and 119 are provided on the housings 10 and 110, respectively, and at the same time, the second anti-rotation protrusions 36 and 136 are provided on the extension members 30 and 130, respectively, but only the first anti-rotation protrusions 19 and 119 may even be provided.

The invention claimed is:

1. A flange grounding device, wherein a predetermined interval is present between flanges provided at ends of pipes, respectively, the device grounding between the flanges of both sides and comprising:
   a housing having an inner space opened through an inlet of one end and an opposite end being brought into contact with the flange of one side;
   an elastic member positioned at the inner space of the housing; and
   an extension member having one end supported by the elastic member at the inner space of the housing and an opposite end protruding outward of the housing and being in contact with the flange of another side,
   wherein, at the opposite end of the housing, a first position setting protrusion is protrudingly provided, thereby being seated in a first seating groove provided in the flange of the one side, and
   wherein, on an outer surface of the opposite end of the housing, on which the first position setting protrusion is provided, a plurality of first anti-rotation protrusions is provided at predetermined intervals around the first position setting protrusion, thereby being seated in first anti-rotation grooves provided on the flange of the one side.

2. The device of claim 1, wherein
   at the opposite end of the extension member, a second position setting protrusion is protrudingly provided, thereby being seated in a second seating groove provided in the flange of the another side.

3. The device of claim 1, wherein, on an outer surface of the opposite end of the extension member, on which the second position setting protrusion is provided, a plurality of second anti-rotation protrusions is provided at predetermined intervals around the second position setting protrusion, thereby being seated in second anti-rotation grooves provided on the flange of the another side.

4. The device of claim 1, wherein a latching step is provided at an inner surface of the inlet of the housing, and a hooking step surrounding an outer surface of a rear end of the extension member is protrudingly provided, thereby regulating an extent of an extension member protruding outward of the housing.

5. The device of claim 4, wherein an outer diameter of the hooking step region is
   greater than an inner diameter of the inlet of the latching step region, and is smaller than an inner diameter of the inner space of the housing.

6. A flange grounding device, wherein a predetermined interval is present between flanges provided at ends of pipes, respectively, the device grounding the spaced flanges by coupling the flanges together using a bolt and a nut and comprising:
   a housing having an inner space having both an inlet of one end and a housing penetration portion of an opposite end opened, the opposite end being brought into contact with the flange of one side;
   an elastic member positioned at the inner space of the housing; and
   an extension member having one end supported by the elastic member at the inner space of the housing and an opposite end protruding outward of the housing and being brought into contact with the flange of another side and provided with a member penetration portion through which the bolt penetrates and
   wherein, on an outer surface of the opposite end of the housing, on which the housing penetration portion is provided, a plurality of first anti-rotation protrusions is provided at predetermined intervals, thereby being seated in first anti-rotation grooves provided on the flange of the one side.

7. The device of claim 6, wherein, on an outer surface, of the opposite end of the extension member, a plurality of second anti-rotation protrusions is provided at predetermined intervals, thereby being seated in second anti-rotation grooves provided on the flange of the another side.

8. The device of claim 6, wherein a latching step is provided at an inner surface of the inlet of the housing, and a hooking step surrounding an outer surface of a rear end of the extension member is protrudingly provided, thereby regulating an extent of the extension member protruding outward of the housing.

9. The device of claim 8, wherein an outer diameter of the hooking step region is
   greater than an inner diameter of the inlet of the latching step region, and is smaller than an inner diameter of the inner space of the housing.

* * * * *